Patented Apr. 15, 1941

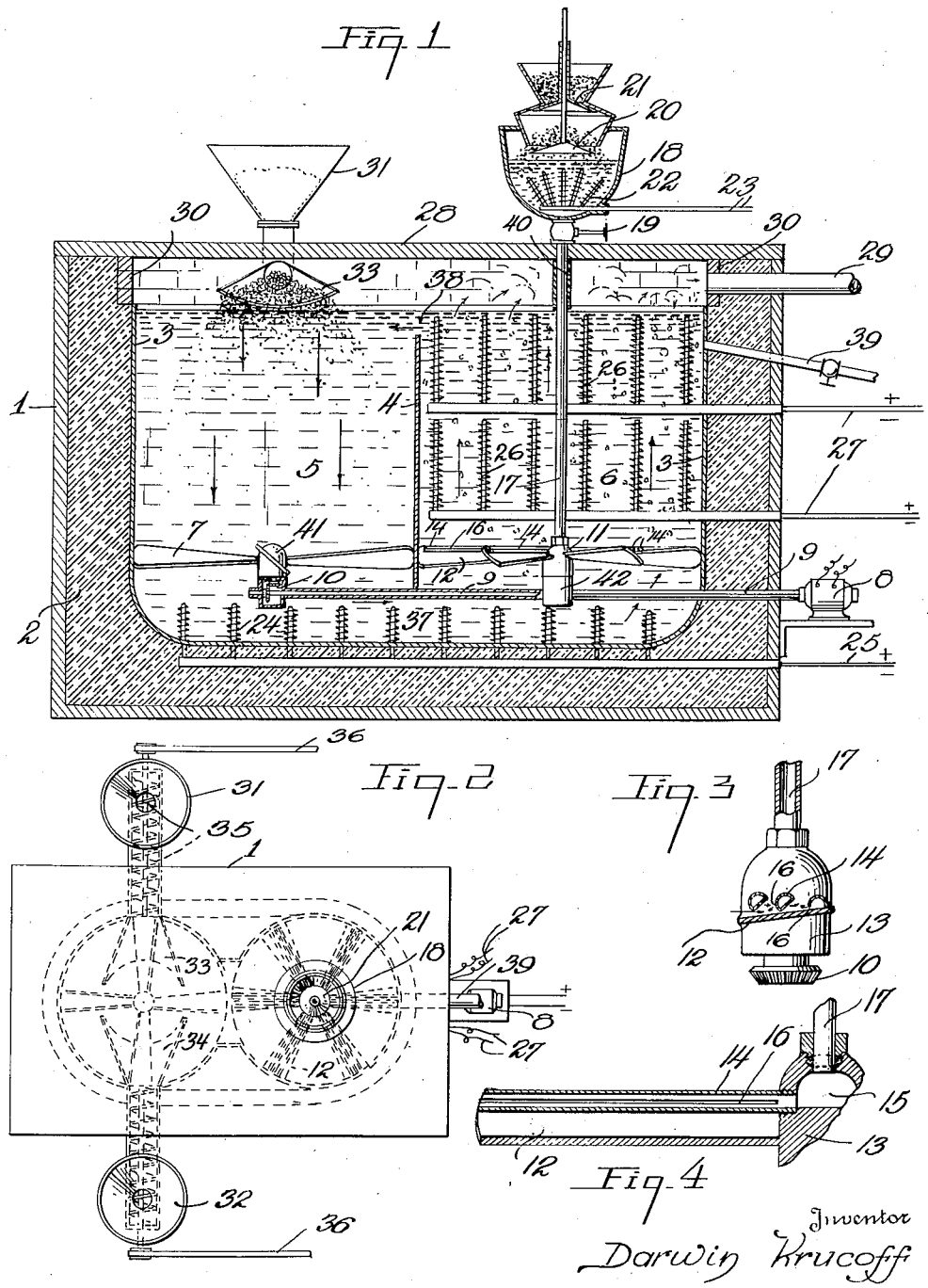

2,238,421

UNITED STATES PATENT OFFICE 2,238,421

PROCESS AND APPARATUS FOR PRODUCTION OF ANHYDROUS HALIDES AND FUSIBLE SILICATES

Darwin Krucoff, Washington, D. C.

Application September 22, 1938, Serial No. 231,254

9 Claims. (Cl. 23—93)

This invention relates primarily to a process and apparatus for the manufacture of aluminum chloride and sodium silicate, but it is applicable to other chemical compounds.

An object of the invention is to react a compound of fairly high melting point with a relatively low melting point fusible salt to form a liquid reaction product and a gas, by dissolving the high melting point compound into the liquid reaction product to form a freely flowing liquid solution, and then introducing the fusible salt into said liquid solution; and in the case of readily volatile fusible salt, rapidly dispersing the same in the solution to prevent volatilization of the fusible salt into the gas formed in the reaction.

Another object of the invention is to react a metal silicate of difficult fusibility or refractory characteristics with a low melting fusible salt such as sodium chloride to form a fluid sodium silicate which forms a free flowing solution when mixed with the said metal silicate, whereby a volatile chloride is produced as a gas in the reaction by rapid dispersion of the fusible salt throughout the free flowing solution.

Other objects of the invention are to produce anhydrous aluminum chloride in an economical and efficient manner, and by reacting aluminum silicate with sodium chloride; to produce sodium silicate, by reacting sodium chloride, together with a silicate of a metal whose chloride is a gas at the reaction temperature, such as aluminum silicate; all performed under the conditions and in the manner hereinafter described and claimed.

Another object of the invention is to utilize natural aluminum bearing minerals such as albite, bauxite, kaolinite, etc., as a source of aluminum and to process one or more of them by dissolving the same in a fluid silicate of a metal which produces a freely flowing low temperature molten mixture in admixture with the mineral, and then reacting the liquid molten solution with fused chloride of the metal of the solvent silicate under conditions preventing volatilization of the chloride.

Still other objects of the invention include dissolving aluminum silicate in an excess of fused sodium silicate as a solvent and then reacting the aluminum silicate therein with sodium chloride to form aluminum chloride and additional sodium silicate; utilizing fused sodium silicate as a solvent for both aluminum silicate and sodium chloride whereby these compounds may react with each other therein; a method of introducing sodium chloride into aluminum silicate dissolved in sodium silicate, which method comprises spraying sodium choride into a confined space wherein the aluminum silicate-sodium silicate fused mixture is rapidly whirled, causing the sodium chloride to react with the aluminum silicate without volatilizing the sodium chloride into the bubbles of gaseous aluminum chloride formed to contaminate the same.

Another object of the invention is the provision of a method and apparatus for dispersing fused sodium chloride in reacting proportions into a moving column of fused sodium silicate-aluminum silicate solution by spraying the sodium chloride through tube-like slitted orifices attached to the blades of a propeller rotating rapidly in the said column.

Another object of the invention is the provision of a novel furnace and other apparatus for carrying out the process disclosed herein or other similar processes.

Other objects of the invention will be evident from the following disclosure, which is illustrative, and contemplates the preferred mode of procedure and apparatus therefor.

The drawing herewith is illustrative of the invention; but the invention is not to be slavishly restricted thereto as it is obviously within the ability of those skilled in the art to make equivalent alterations, and the invention to be restricted only by the scope of the appended claims.

In the drawing:

Fig. 1 is an elevational view partly in cross-section of the apparatus for carrying out the process.

Fig. 2 is a plan view of the apparatus shown in Fig. 1.

Fig. 3 is a detail fragmentary view of the propeller in section such as is shown on the right-hand side of Fig. 1, one tube thereof being shown in enlarged cross-section.

Figure 4 is a transverse section of the same propeller showing the attachment of the liquid dispersing tubes to the hub and blade, the tubes being shown in enlarged diameter for better illustration.

Referring more specifically to the drawing and Fig. 1, the numeral 1 indicates a generally closed furnace or retort casing in which the process is carried out. Said casing is lined with refractory or insulating material 2 for conservation of heat and has an inner lining 3, preferably made of metal or other material which is substantially unattacked by the reacting materials and reaction products of the invention. This inner lining may be iron or any well-known non-corrosive alloy, and it forms a bath or container for the reacting materials. This bath is divided into two major compartments by means of partition 4. It will be noted that these compartments are not sealed from each other but instead are in adjacent communication both at the top and bottom of the said partition. In the compartment or chamber 5, shown at the lefthand side of Fig. 1, is located a propeller 41, the blades 7 of which are substantially flush with the wall 3 and the partition 4. The propeller 41 is actuated by the electric motor 8 through the medium of the transmission shaft 9 and suitable gearing 10. On the righthand side of the partition 4 is provided another propeller 11 with blades 12 that are substantially flush at their outer ends with wall 3 and partition 4, and which propeller operates in the chamber 6 shown on the righthand side of the drawing of Fig. 1. The propeller 11 is actuated by the motor 8 through the medium of the transmission shaft 9 and gearing 12. The gearing 10 and 12 are each housed in a suitable housing and the transmission shaft 9 is also enclosed or covered, so that they are not attacked or interfered with in their operation by the reacting materials. While both propellers are shown as operated from the same drive-shaft and motor, they may be separately driven by individual power devices and at different speeds. The propeller 11 is shown in detail in Figs. 3 and 4 and is different in construction from the propeller 41. The propeller 11 is provided with a hub member 13 secured to the propeller blade 12 by welding or the like, and a feature of the propeller is the plurality of horizontally extending dispersing tubes 14 shown in Figs. 3 and 4. These tubes are indicated as three in number but actually any suitable number may be utilized in the practice of the invention. As indicated in Fig. 3, these tubes communicate with the hollow chamber 15 of the hub 13 and are intended to receive fused or molten reagent from said hub chamber and to disperse the same in the chamber 6 by the narrow longitudinal slits 16 which are on opposite sides of each tube 14. Connected with the hub 13 of the propeller 11 is a longitudinally extending tube 17 which is non-rotatable and extends upwardly and communicates with the reagent tower-bowl 18, the valve 19 permitting fluid to flow or to be arrested from the bowl 18 into the tubular member 17 and from thence into the chamber 15 of the hub 13 of the propeller 11. The tube 17 extends vertically through the chamber 6 and is formed of material which is not attacked by the reactions of the process. The bowl 18 is in the nature of a funnel which is closed at its entrance by the double hopper means 20 and 21. The materials placed in said bowl for fusion are heated by the heating coils 22 connected to the power line 23. It will be obvious that the bowl 18 may be heated by external means, or the material which is intended to be placed therein, may be fused or made liquid elsewhere and transferred thereto in fluid condition. At the base of the retort or furnace 1, electrical heating means 24 are provided by connection to the electric power line 25, and these heating coils extend through the lining 3 for the purpose of directly heating the materials in the bath. Here also, the invention is not to be slavishly restricted to internal heating means, nor to electric heating. Any of the known forms of heating may be utilized in the practice of the invention, and they may be internal as well as external, or both. Gas or fuel oil heating may be used.

Within the chamber 6 of the bath, additional heating coils 26 fed by power lines 27 are used, but it is also to be understood that this portion of the bath may be heated internally or externally by any industrial fuel or electrical heating means. The top of the retort or furnace is closed with a cover 28, immediately beneath which is a longitudinal chamber or space extending the full length of the retort, and in which gaseous reaction products are intended to be removed through the outlet 29, which outlet is carried by the brickwork 30. On the lefthand side of the partition 4 as shown in Fig. 1, the two feeding hoppers 31 and 32 (shown in plan in Fig. 2) engage with both sides of the retort or furnace 1 and extend therethrough. These hoppers enter the brickwork 30 through the side walls of the furnace, and terminate in flared feeding funnels 33 and 34. Each hopper construction contains a feed screw 35 operated by a power belt 36. These feed screws may be constructed to lie in a plane above the level of escape pipe 29.

Referring further to the drawing, the general method of operating the apparatus is to provide reacting ingredients in the feed hoppers 31 and 32 and feed the same down into compartment 5. The chamber 5 is adapted to contain fluid ingredients which are highly heated as they have just come from the heating coils 26. The propeller 41 drives the fluid downwardly through the outlet 37 communicating with the chamber 6 underneath partition 4. The fluid materials arriving in chamber 6 are brought into contact with the rotating propeller 11 which disperses through its slitted tubes 14, reacting fluid fed downwardly from the bowl 18. In the reaction that takes place, gases formed rise and are vented through the outlet 29 while fluid products of reaction overflow the partition 4 and circulate back into chamber 5 at the exit 38, while an exact portion is drawn off through the valved tube 39. In this way, it is clear that the apparatus may be used for any continuous reaction process, although the present invention is directed to the preparation of aluminum chloride and sodium silicate, and like products.

In this method of producing aluminum chloride, various natural or artificial compounds of aluminum may be used to provide the aluminum and/or silica component, which compounds are fed through the hoppers 31 and 32, wherein the same are dissolved in a liquid bath of sodium silicate in the chamber 5. The material in each of the hoppers is fed by means of the worm screws 35 through the chutes 33 into the furnace chamber. Sodium aluminum silicate ($NaAlSi_3O_8$) or other aluminum silicate containing more or less silica is fed into the furnace through hopper 31, while in the hopper 32, bauxite or aluminum silicate very low in silica will be fed into the furnace. These materials are fed from the hoppers into the furnace simultaneously and continuously to form a solution in the chamber 5 of the desired percentages of sodium silicate, aluminum silicate, and silica. Mixtures containing widely varying percentages of these materials can be used and many different minerals may be used to supply the necessary essential materials. Double silicates of aluminum together with other metals may be used providing the silicate of the other metal does not raise the melting point of the fluid melt or solution too much, or does not interfere with the viscosity of the melt or solution. As an example, potassium feldspar can be used instead of sodium feldspar and the potassium silicate separated from the sodium silicate after removal from the furnace, thereby furnishing a source of potassium compounds. The charges of materials are fed onto very highly heated fluid sodium silicate circulating into chamber 5 from chamber 6 over the top of partition 4 through the opening 38, and which sodium silicate has been highly heated in chamber 6 by the heating coils 26. The sodium silicate bath may be made up by fusing a raw material such as quartz or the like with an appropriate sodium compound. The charge thus fed through the hoppers dissolves in the sodium silicate melt and reaching the four blades 7 of the propeller 41 is circulated in a downward path below the partition 4 through the opening 37 to enter chamber 6. The propeller 41 stirs the charge as the same proceeds downwardly and keeps any solid material from adhering to the furnace lining and partition. In passing downwardly through the chamber 5, the solution melt cools somewhat, but it is reheated by the heating coils 24 while passing through the opening 37 below the partition 4 to enter the chamber 6.

In the chamber 6, the solution melt of aluminum silicate in sodium silicate circulates upwardly and in this chamber, it is reacted with sodium chloride to form aluminum chloride and sodium silicate. The reaction is accomplished by feeding molten sodium chloride downwardly from the bowl 18 through the tube 17 into the hub 13 of the six bladed propeller 11, and from thence outwardly and laterally through the tubes 14 which extend to the ends of each blade. As the blades revolve, the liquid melt passes through the diametrically opposed slits 16 in each of the tubes 14, and in passing through these tubes between the slit openings, the melt receives the proper amount of sodium chloride. The tubes need not necessarily be cylindrical, and the number of tubes and the spaces between them, and the size and position of the slits may be altered to obtain maximum dispersion of sodium chloride through the melt. The rapid whirling of the melt by the propeller blades 12 mixes the sodium chloride throughout the same causing all of it to react with all the aluminum silicate therein without volatilization of the sodium chloride into the bubbles of gaseous aluminum chloride formed by the reaction. The aluminum chloride gas rises through the melt in the chamber 6 and passes out of the furnace through the tube 29 where it may be collected as an industrial product. The sodium silicate in chamber 6 is reheated by the coils 26 and circulated over the partition 4 through the opening 38 into the chamber 5 for further processing as before. The excess amount of sodium silicate formed in the reaction is withdrawn through the outlet 39 for use as an industrial product.

The invention is not slavishly restricted to the shape of the furnace as shown. The depth of the chamber 5 should be such so that the materials fed through the hoppers, such as aluminum silicate, are completely dissolved just before they reach the propeller 41. The chamber 6 must have sufficient depth so that the sodium silicate will be highly heated before it passes into chamber 5. Hence the position of the partition 4 between these chambers may be adjusted by moving the same toward the right or left to regulate the rate of flow of the material downwardly in chamber 5 constituting one channel, and upwardly into chamber 6 constituting another channel. The propellers 6 and 11 need not extend all the way across the respective chambers 5 and 6. The chambers may be widened and the propellers occupy the center of them respectively with the remainder of the chambers closed, in order to keep the solid mass in the left chamber more in the center until it is dissolved, and to decrease the rate of flow in the other chamber. The sodium chloride fed in solid form through the the double self-sealing hopper 20 and 21 into the sealed tower bowl 18 is fused by the heating coils 22 and flows downwardly through the tube 17 which is protected with a covering of ceramic or other protective material 40 from the top of the furnace to a point slightly above the surface of the melt. The tower bowl 18 may be raised to increase the pressure flow of the sodium chloride into the melt to the proper rate, or any suitable means such as a pump may be used to force it therein.

The gaseous aluminum chloride leaving the furnace through tube 29 may be processed for purification. As an example, it is passed through highly heated carbon to reduce the ferric chloride contained therein to ferrous chloride, which is then separated together with other impurities from aluminum chloride by fractional condensation. The purified aluminum chloride may be used for various industrial uses, or it may be further processed to form other chemical compounds and products. For example, it may be heated with steam to form aluminum oxide and hydrogen chloride, which hydrogen chloride may be used as an industrial product, or in turn oxidized to form chlorine.

The sodium silicate withdrawn from outlet 39 from the furnace may be used as a basic compound in the production of many substances. It can be further processed for purification. It may be dissolved in water, and treated with calcium hydroxide to produce sodium hydroxide in the same manner in which sodium carbonate is now treated with calcium hydroxide to form sodium hydroxide. Sodium carbonate can then be formed by passing carbon dioxide into the sodium hydroxide solution. Sodium sulphate can also be produced by treating a water solution of sodium silicate with iron sulphate. These are merely examples of the various uses to which the main products of the present invention may be put, and obviously many other side reactions can be effected.

As above described, the invention comprises a process and apparatus for the reaction between aluminum silicate and sodium chloride, which reaction is brought about by first dissolving the aluminum silicate in sodium silicate. The percentage of aluminum silicate in the solution melt and the silica content of the same is such that the solution melt is quite fluid at about 1050° C. to 1150° C. which is an example of approximately the average temperature at which the furnace is maintained. The percentage of silica in the aluminum silicate is such that when the aluminum silicate reacts with the sodium chloride, sodium silicate of the same percentage of silica as that which was started with is formed. The percentage of aluminum silicate in the sodium silicate-aluminum silicate solution may be varied, but it is preferably from about 20 to 30%, the remainder being sodium silicate, while the percentage of silica in the sodium silicate may vary from about 40% to 50%. These percentages are not restrictive, but are merely exemplary.

The present invention is based upon the essential features of dissolving aluminum silicate in fused sodium silicate and then reacting the same properly with sodium chloride. The fused sodium silicate causes the aluminum silicate to dissolve therein and the solution thus formed readily dissolves sodium chloride to bring about the desired reaction. In other words, the process is predicated upon the use of the liquid product of the reaction, in this case sodium silicate, to serve as a solvent to dissolve both aluminum silicate and sodium chloride for reaction purposes. Another important feature of the invention is the method in which the sodium chloride is introduced into the sodium silicate-aluminum silicate solution melt. Sodium chloride volatilizes readily at temperatures even slightly above its melting point at 804° C. Because of this fact, and the fact that aluminum silicate dissolves in sodium chloride only to a slight extent, it has been impossible heretofore to economically cause these two compounds to react. By dissolving both compounds in fused sodium silicate, I provide a reacting medium, and by introducing the sodium chloride in said medium by dispersing the same therein, the objectional volatilizing of the sodium chloride is minimized. The method of introduction of the sodium chloride consists in rapidly whirling the sodium silicate-aluminum silicate solution by means of the propeller 11 in the chamber 6, and spraying molten sodium chloride through the tubes of the propeller shown in Fig. 4 so that the sodium chloride is dispersed as completely as possible throughout the melt. As the sodium silicate-aluminum silicate solution rises up the chamber 6, the exact amount of sodium chloride in chemically reacting proportions to react with the aluminum silicate is instantly dispersed throughout the solution. By means of this instant complete dispersal of the sodium chloride throughout the sodium silicate-aluminum silicate solution, all of the sodium chloride reacts with aluminum silicate to form sodium silicate and gaseous aluminum chloride without substantially any of the sodium chloride volatilizing into the bubbles of the gaseous aluminum chloride formed.

The preferable temperature ranges in the preparation of aluminum chloride by the aforesaid reaction would be around 1100° C. to 1250° C. for the sodium silicate which passes from chamber 6 into the top of chamber 5, and then a cooling of the same as it descends in chamber 5 to approximately 1000° C. to 1100° C. by the time the solution of aluminum silicate-sodium silicate reaches the heating coils 24. The melting points of the preferred mixtures used in the process approximate from about 950° C. to about 1100° C.

It is necessary to eliminate water or moisture in order to maintain anhydrous conditions and produce anhydrous products. The entering air may be dried.

In the process above described, it is necessary that the metal radical of the fusible salt be identical with the metal radical of solvent silicate.

The apparatus is obviously useful for many other chemical processes. The number, shape and pitch of the propeller blades 12 may be altered to obtain optimum dispersion of sodium chloride or like reagent through the melt. The dispersion will be such that all the sodium chloride will move upwardly at a uniform rate as it issues from the various tubes. The terminal ends of the blades 12 are closed to insure the movement of the fused melt between the tubes.

What I claim is:

1. The method of producing aluminum chloride in a continuous process which comprises forming a fused bath of sodium silicate, charging therein predetermined proportions of aluminum silicate components, dissolving the said components in the sodium silicate, reacting the aluminum silicate therein with fused sodium chloride, removing gaseous aluminum chloride and excess sodium silicate, and returning the major portion of sodium silicate to the first named bath.

2. The process of producing aluminum chloride and sodium silicate which comprises forming a bath of fused sodium silicate, dissolving therein an aluminum silicate, separately fusing sodium chloride apart from said solution, and mixing the fused sodium chloride in chemically reacting proportions for the aluminum silicate constituent with said aluminum silicate-sodium silicate solution below the level of the same with agitation and dispersion.

3. The process set forth in claim 2 in which the temperature of the fused silicate solution is maintained at about 1100° C.

4. The method of producing aluminum chloride which comprises dissolving an aluminous material in a bath of fused sodium silicate, whirling said solution, and spraying a hot fusion of sodium chloride into said whirling solution to react with said aluminous material whereby volatilization of the sodium chloride is substantially minimized.

5. The continuous process of producing anhydrous aluminum chloride and sodium silicate which comprises dissolving a compound of aluminum and silicious material in a prefused bath of sodium silicate, circulating the solution upwardly and imparting thereto a whirling motion, spraying laterally into said solution a predetermined amount of fused sodium chloride to react therein, removing aluminum chloride and sodium silicate as products, and recirculating remaining sodium silicate downwardly together with a new portion of aluminum and silicious compounds.

6. The process of producing anhydrous aluminum chloride which includes the steps of forming a molten solution of aluminum silicate dissolved in an alkali silicate solvent phase, reacting the aluminum silicate while in said phase with a chloride of the metal of the solvent silicate in chemically reacting proportions, the alkali chloride being introduced as a molten liquid in the silicate solvent phase below the level of the molten surface, and separating the reaction products.

7. In a process of producing anhydrous aluminum chloride, the step of introducing in molten state a low melting fusible halide salt volatile at low temperatures into a freely flowing molten solution of aluminous materials for reaction therewith by rapidly dispersing the same therein with whirling agitation to prevent volatilization of the said fusible salt into the gas formed in the reaction.

8. The process of reacting a metal silicate of refractory character to produce a volatile metal halide gas which comprises forming a molten bath of said metal silicate in a solvent bath of molten alkali silicate, adding thereto an alkali halide in molten condition, dispersing the molten halide through the free flowing molten solution of silicates to react with the said metal silicate, and withdrawing volatile metal halide gas as one of the products.

9. The method of producing anhydrous aluminum halide in a continuous process which includes forming a fused bath of alkali silicate, charging therein predetermined proportions of aluminum silicate components, dissolving the said components in the alkali silicate bath, reacting the aluminum silicate therein with fused alkali halide by fusing alkali halide and dispersing the same within the fused bath of alkali silicate, and removing gaseous aluminum halide and excess alkali silicate.

DARWIN KRUCOFF.